United States Patent
Kang

(10) Patent No.: US 9,681,381 B2
(45) Date of Patent: Jun. 13, 2017

(54) BLUETOOTH LOW ENERGY (BLE) DEVICE AND METHOD FOR ADJUSTING OPERATION MODE OF APPLICATION PROCESSOR BASED ON INFORMATION COMMUNICATED WITHIN BLE PACKET

(71) Applicant: Samsung Electronics Co., Ltd., Suwon-si, Gyeonggi-do (KR)

(72) Inventor: Hyuk Kang, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 122 days.

(21) Appl. No.: 14/341,046

(22) Filed: Jul. 25, 2014

(65) Prior Publication Data

US 2015/0099467 A1    Apr. 9, 2015

(30) Foreign Application Priority Data

Oct. 4, 2013    (KR) ..................... 10-2013-0118733

(51) Int. Cl.
*H04W 52/02*    (2009.01)
*H04W 4/00*    (2009.01)
*H04L 29/06*    (2006.01)
*H04L 29/08*    (2006.01)
*H04W 8/00*    (2009.01)
*H04W 4/06*    (2009.01)

(52) U.S. Cl.
CPC ....... *H04W 52/0229* (2013.01); *H04W 4/008* (2013.01); *H04L 67/16* (2013.01); *H04L 69/22* (2013.01); *H04W 4/06* (2013.01); *H04W 8/005* (2013.01); *H04W 52/0235* (2013.01)

(58) Field of Classification Search
CPC ... H04W 4/008; H04W 4/06; H04W 52/0229; H04W 8/005; H04L 69/22; H04L 67/16; H04N 21/4345; H04N 21/2362
See application file for complete search history.

(56) References Cited

U.S. PATENT DOCUMENTS 9,094,175 B2 * 7/2015 Abraham ............... H04L 1/0061
2002/0051195 A1 * 5/2002 Arakawa ............ H04N 1/00957
  358/1.15

(Continued)

FOREIGN PATENT DOCUMENTS

EP    2 400 714 A1    12/2011

OTHER PUBLICATIONS

Core System Package [Low Energy Controller Volume], Specification of the Bluetooth System, Version 4.0, Jun. 30, 2010, pp. 1-136, vol. 6, Bluetooth, retrieved Jan. 12, 2012 from www.bluetooth.com.

*Primary Examiner* — Devan Sandiford
(74) *Attorney, Agent, or Firm* — Jefferson IP Law, LLP

(57) ABSTRACT

A method of broadcasting a Bluetooth Low Energy (BLE) packet, the method is provided. The method includes generating a random address that includes service identification information of a device, writing the generated random address to a header of the BLE packet, and broadcasting the BLE packet including the header where the generated random address is written, wherein the service identification information of the device includes information to switch an Application Processor (AP) in an external device that receives the BLE packet from a sleep mode to an awake mode.

19 Claims, 13 Drawing Sheets

(56) References Cited

U.S. PATENT DOCUMENTS

| | | | |
|---|---|---|---|
| 2002/0054339 A1* | 5/2002 | Arakawa | H04N 1/00408 358/1.15 |
| 2003/0147369 A1* | 8/2003 | Singh | H04L 1/0007 370/338 |
| 2003/0210694 A1* | 11/2003 | Jayaraman | H04L 67/1008 370/392 |
| 2006/0262751 A1* | 11/2006 | Vermola | H04H 20/26 370/331 |
| 2007/0300275 A1* | 12/2007 | Kim | H04H 20/22 725/112 |
| 2010/0110962 A1* | 5/2010 | Igarashi | H04W 72/005 370/312 |
| 2010/0141400 A1* | 6/2010 | Radulescu | H04W 52/0225 340/10.33 |
| 2011/0319020 A1* | 12/2011 | Desai | H04L 63/02 455/41.2 |
| 2012/0052802 A1 | 3/2012 | Kasslin et al. | |
| 2012/0182980 A1* | 7/2012 | Abraham | H04L 1/0061 370/338 |
| 2012/0196534 A1 | 8/2012 | Kasslin et al. | |
| 2012/0258669 A1* | 10/2012 | Honkanen | G01S 3/46 455/67.11 |
| 2013/0028162 A1* | 1/2013 | Radulescu | H04M 1/7253 370/311 |
| 2013/0065584 A1* | 3/2013 | Lyon | H04W 28/06 455/434 |
| 2013/0090061 A1 | 4/2013 | Linde | |
| 2013/0165044 A1* | 6/2013 | Xie | H04W 52/0229 455/41.2 |
| 2013/0188544 A1* | 7/2013 | Tiwari | H04W 52/0222 370/311 |
| 2013/0203413 A1* | 8/2013 | Lambert | H04L 67/16 455/435.1 |
| 2014/0220883 A1* | 8/2014 | Emigh | H04H 20/61 455/3.01 |
| 2015/0012761 A1* | 1/2015 | Li | H04W 52/0235 713/310 |
| 2015/0215781 A1* | 7/2015 | Reed | H04L 9/3226 726/5 |
| 2015/0319674 A1* | 11/2015 | Hughes | H04W 48/16 455/41.2 |
| 2016/0007288 A1* | 1/2016 | Samardzija | H04W 52/0229 370/311 |
| 2016/0007289 A1* | 1/2016 | Weizman | H04W 52/0229 370/311 |

* cited by examiner

FIG. 4

| Value (410) | Data Type Name (420) | Definition (430) |
|---|---|---|
| 0x01 | «Flags» | (0) LE Limited Discoverable Mode<br>(1) LE General Discoverable Mode<br>(2) BR/EDR Not Supported<br>(3) LE AND BR/EDR SIMULTANEOUS AVAILABILITY (Controller)<br>(4) LE AND BR/EDR SIMULTANEOUS AVAILABILITY (Host) |
| 0x02 | «Incomplete List of 16-bit Service Class UUIDs» | More 16-bit UUIDs available |
| 0x03 | «Complete List of 16-bit Service Class UUIDs» | Complete list of 16-bit UUIDs available |
| 0x04 | «Incomplete List of 32-bit Service Class UUIDs» | More 32-bit UUIDs available |
| 0x05 | «Complete List of 32-bit Service Class UUIDs» | Complete list of 32-bit UUIDs available |
| 0x06 | «Incomplete List of 128-bit Service Class UUIDs» | More 128-bit UUIDs available |
| 0x07 | «Complete List of 128-bit Service Class UUIDs» | Complete list of 128-bit UUIDs available |
| 0x08 | «Shortened Local Name» | |
| 0x09 | «Complete Local Name» | Max 248 bytes, 82 characters |
| 0x0A | «Tx Power Level» | 0xXX: -127 to +127dBm |
| 0x0D | «Class of Device» | Optional OOB Tags |
| 0x0E | «Simple Pairing Hash C» | Optional OOB Tags |
| 0x0F | «Simple Pairing Randomizer R» | Optional OOB Tags |
| 0x10 | «Device ID» | |
| 0x10 | «Security Manager TK Value» | Temporary Key (TK): a 128-bit temporary key used in the pairing process |
| 0x11 | «Security Manager Out of Band Flags» | (0) OOB data not present = 0, present = 1<br>(1) LE supported (Host)<br>(2) LE AND BR/EDR SIMULTANEOUS AVAILABILITY (Host)<br>(3) Address type (0=Public, 1=Random) |
| 0x12 | «Slave Connection Interval Range» | Conn_Interval_Min and Conn_Interval_Max<br>(range : 0x0006 to 0x0C80, 7.5ms ~ 4s) |
| 0x14 | «List of 16-bit Service Solicitation UUIDs» | REQUEST FOR LIST OF 16 BIT SERVICE UUIDs SERVICE |
| 0x15 | «List of 128-bit Service Solicitation UUIDs» | REQUEST FOR LIST OF 128 BIT SERVICE UUIDs SERVICE |
| 0x16 | «Service Data» | 16 bit Service UUID + Service Data |
| 0x17 | «Public Target Address» | |
| 0x18 | «Random Target Address» | |
| 0x19 | «Appearance» | |
| 0xFF | «Manufacturer Specific Data» | Company ID Code + MSD |

BLE Advertising Packet

BLUETOOTH LOW ENERGY (BLE) DEVICE AND METHOD FOR ADJUSTING OPERATION MODE OF APPLICATION PROCESSOR BASED ON INFORMATION COMMUNICATED WITHIN BLE PACKET

CROSS-REFERENCE TO RELATED APPLICATION(S)

This application claims the benefit under 35 U.S.C. §119 (a) of a Korean patent application filed on Oct. 4, 2013 in the Korean Intellectual Property Office and assigned Serial No. 10-2013-0118733, the entire disclosure of which is hereby incorporated by reference.

TECHNICAL FIELD

The present disclosure relates to a method of broadcasting a Bluetooth Low Energy (BLE) packet, a method of adjusting an operation of an Application Processor (AP), and devices for performing the same.

BACKGROUND

Bluetooth is a wireless technology for short-range communication. Accordingly, use of cables to connect devices to each other is rendered unnecessary. For example, a cellular phone or a laptop computer having a Bluetooth function may be connected to a wireless communication network without having to use a cable connection. All digital devices, including printers, Personal Digital Assistants (PDAs), desktop computers, FAX machines, keyboards, and joysticks, may be a part of a Bluetooth network. In addition to removing the necessity of using cable connections, Bluetooth may also be used to form an interface between an existing data network and peripheral devices and also form a special group between devices which are located far from a fixed network infrastructure. Bluetooth provides a strong wireless connection based on quick recognition and use of a frequency hopping method. A Bluetooth module prevents interference with other signals by hopping to a new frequency after transmission or reception of a packet. Compared to other systems which operate within the same frequency range, Bluetooth uses a specially short and fast packet. Since Bluetooth version 4.0, which has all functions provided by classic Bluetooth, Bluetooth high speed, and Bluetooth Low Energy (BLE), has been released, there has been a growing interest in BLE technology.

Accordingly, a method of broadcasting a Bluetooth Low Energy (BLE) packet, a method of adjusting an operation mode of an Application Processor (AP), and devices for performing the method, wherein a device writes filtering information for waking up the AP, for example, service identification information or company identification information to a header of the BLE packet so that a device for receiving the filtering information may reduce a current that is consumed by the AP is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of broadcasting a Bluetooth Low Energy (BLE) packet, a method of adjusting an operation mode of an Application Processor (AP), and devices for performing the method, wherein a device writes filtering information for waking up the AP, for example, service identification information or company identification information to a header of the BLE packet so that a device for receiving the filtering information may reduce a current that is consumed by the AP.

Another aspect of the present disclosure is to provide a method of broadcasting a BLE packet by writing information about a total number of all packets, for example, a final number of all packets and identification information of a current packet, for example, a current number of a packet to the BLE packet so as to overcome length limitation of a BLE advertising packet.

Additional aspects will be set forth in part in the description which follows and, in part, will be apparent from the description, or may be learned by practice of the presented embodiments.

In accordance with an aspect of the present disclosure, a method of broadcasting a BLE packet is provided. The method includes generating a random address that includes service identification information of a device, writing the generated random address to a header of the BLE packet, and broadcasting the BLE packet including the header where the generated random address is written. The service identification information of the device includes information that is used to switch an AP included in an external device that receives the BLE packet from a sleep mode to an awake mode.

In accordance with another aspect of the present disclosure, a method of adjusting an operation mode of an AP is provided. The method includes receiving from an external device a BLE packet including a header where a random address that includes service identification information of the external device is written, extracting the service identification information of the external device from the header of the BLE packet, comparing the extracted service identification of the external device to service identification information that is preset with regard to a change in an operation mode of the AP, and switching the AP from a sleep mode to an awake mode, based on a result of the comparing.

In accordance with another aspect of the present disclosure, a device for broadcasting a BLE packet is provided. The device includes a controller configured to generate a random address that includes service identification information of the device, and write the generated random address to a header of the BLE packet, and a BLE communication unit configured to broadcast the BLE packet including the header where the generated random address is written. The service identification information of the device includes information that is used to switch an AP included in an external device that receives the BLE packet from a sleep mode to an awake mode.

In accordance with another aspect of the present disclosure, a device for adjusting an operation mode of an AP is provided. The device includes a BLE communication unit configured to receive from an external device a BLE packet that includes a header to which a random address is written, the random address includes service identification information of service identification information of the external device, a filtering unit configured to extract the service identification information of the external device from the header of the BLE packet and, based on a result of comparing the extracted service identification of the external device to service identification information that is preset with regard to a change in an operation mode of an AP, transmitting an awake mode switching command to the AP, and an AP configured to switch from a sleep mode to an awake mode based on the awake mode switching command that is received from the filtering unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a table for explaining an Advertising Data (AD) type of a BLE packet according to an embodiment of the present disclosure;

Throughout the drawings, it should be noted that like reference numbers are used to depict the same or similar elements, features, and structures.

DETAILED DESCRIPTION

Figure 1:
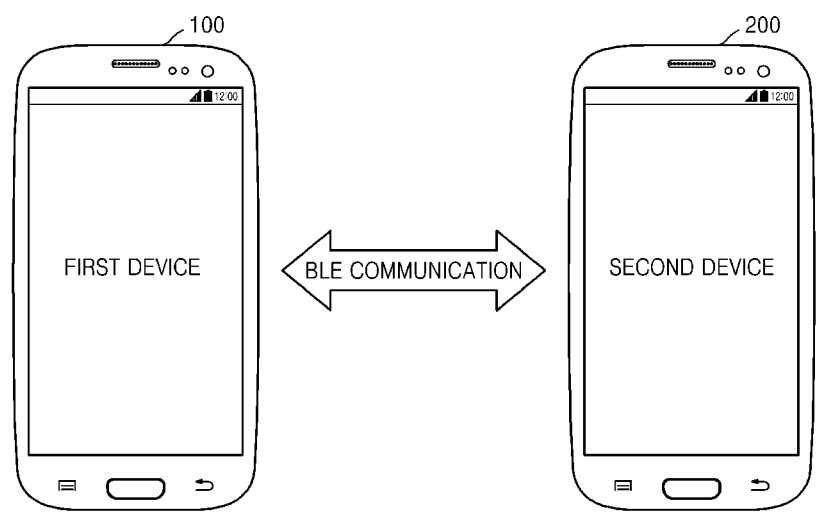
FIG. 1 is a diagram illustrating a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used herein and the embodiments of the present disclosure will be briefly described below.

General and widely-used terms have been employed herein, in consideration of functions provided in embodiments of the present disclosure, and may vary according to an intention of one of ordinary skill in the art, a precedent, or emergence of new technologies. Additionally, in some cases, an applicant may arbitrarily select specific terms. Then, the applicant will provide the meaning of the terms in the description of embodiments of the present disclosure. Accordingly, It will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, terms used herein, such as 'unit' or 'module', mean entities for processing at least one function or operation. These entities may be implemented by hardware, software, or a combination of hardware and software.

Bluetooth Low Energy (hereinafter referred to as 'BLE'), in the description of embodiments of the present disclosure, is one of the Near Field Communication (NFC) technologies and is a key function of Bluetooth version 4.0. BLE has a relatively small duty cycle, compared to classic Bluetooth. A BLE device may be produced at low cost and may operate using a coin-sized battery for several years by reducing average power and standby power.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating a communication system according to an embodiment of the present disclosure.

Referring to FIG. 1, according to an embodiment of the present disclosure, the communication system may include a first device 100 and a second device 200. In the embodiments of the present disclosure, the first device 100 may be a device for broadcasting a packet, and the second device 200 may be a device for discovering and scanning the first device 100 and receiving a packet that is broadcast by the first device 100. The first device 100 and the second device 200 are respectively described in detail below.

According to an embodiment of the present disclosure, the first device 100 may include a BLE communication unit for broadcasting a packet. According to an embodiment of the present disclosure, the first device 100 may broadcast an advertising packet according to a BLE specification. For convenience of description, an advertising packet according to a BLE specification is referred to as a 'BLE packet'.

According to an embodiment of the present disclosure, the first device 100 may write filtering information to a header of the BLE packet. The filtering information may mean information for switching an Application Processor (AP) included in the second device 200 that receives the BLE packet from a sleep mode to an awake mode. For example, service identification number of the first device 100, for example, a service Identification (ID) or company identification information of the first device 100, for example, a company ID, may be used as filtering information. However, the present embodiment is not limited thereto. This will be described in detail by referring to FIG. 5.

According to an embodiment of the present disclosure, in order to overcome a length limitation of the BLE packet, the first device 100 may write one piece of data to a plurality of the BLE packets, and broadcast the plurality of BLE packets. The first device 100 may write information about a total number of all packets, for example, a Final Number (FN) of all the packets and identification information of a current packet, for example, a Current Number (CN) of a packet to the BLE packet. This will be described in detail later by referring to FIG. 10.

According to an embodiment of the present disclosure, the first device 100 may be implemented in various forms. For example, in the embodiments of the present disclosure, the first device 100 may be a cellular phone, a smartphone, a laptop computer, a tablet PC, an e-book terminal, a digital broadcasting terminal, a Personal Digital Assistant (PDA), a Portable Multimedia Player (PMP), a navigation system, a Moving Pictures expert group audio layer 3 (MP3) player, a digital camera, a wearable device such as glasses or a wristwatch, or the like, but is not limited thereto.

The second device 200 may include a BLE communication unit for receiving a BLE packet. According to an embodiment of the present disclosure, the second device 200 may set an operation mode of the AP to a sleep mode or an awake mode. In the sleep mode, the AP may be in a deactivated state. Accordingly, if the AP is in the sleep mode, the second device 200 may reduce power that is consumed by the AP. If an operation of the AP switches from the sleep mode to the awake mode, the AP may be in an activated state.

The second device 200 may switch the AP from the sleep mode to the awake mode, based on filtering information included in a header of the BLE packet that is broadcast by the first device 100, for example, service identification information, company identification information, an FN, or a CN, or filtering information included in a payload of the BLE packet, for example, an FN or a CN. Additionally, the second device 200 may maintain an operation mode of the AP as the sleep mode, based on filtering information included in a header of the BLE packet that is broadcast by the first device 100 or filtering information included in a payload of the BLE packet. This will be described in detail later by referring to FIG. 8.

According to an embodiment of the present disclosure, the second device 200 may be of various types. The second device 200 may be a display apparatus that includes a screen or an accessory apparatus that does not include a screen. For example, in the various embodiments of the present disclosure, the second device 200 may be a cellular phone, a smart phone, a laptop computer, a tablet PC, an e-book terminal, a digital broadcasting terminal, a PDA, a PMP, a navigation system, a MP3 player, a digital camera, a smart TV, a wireless speaker, a Bluetooth headset, glasses, a wristwatch, Home Sync, a refrigerator with a communication function, an air conditioner, a water purifier or the like, but is not limited thereto.

Hereinafter, a configuration of the BLE packet is described in detail by referring to FIGS. 2 through 4.

Figure 2:
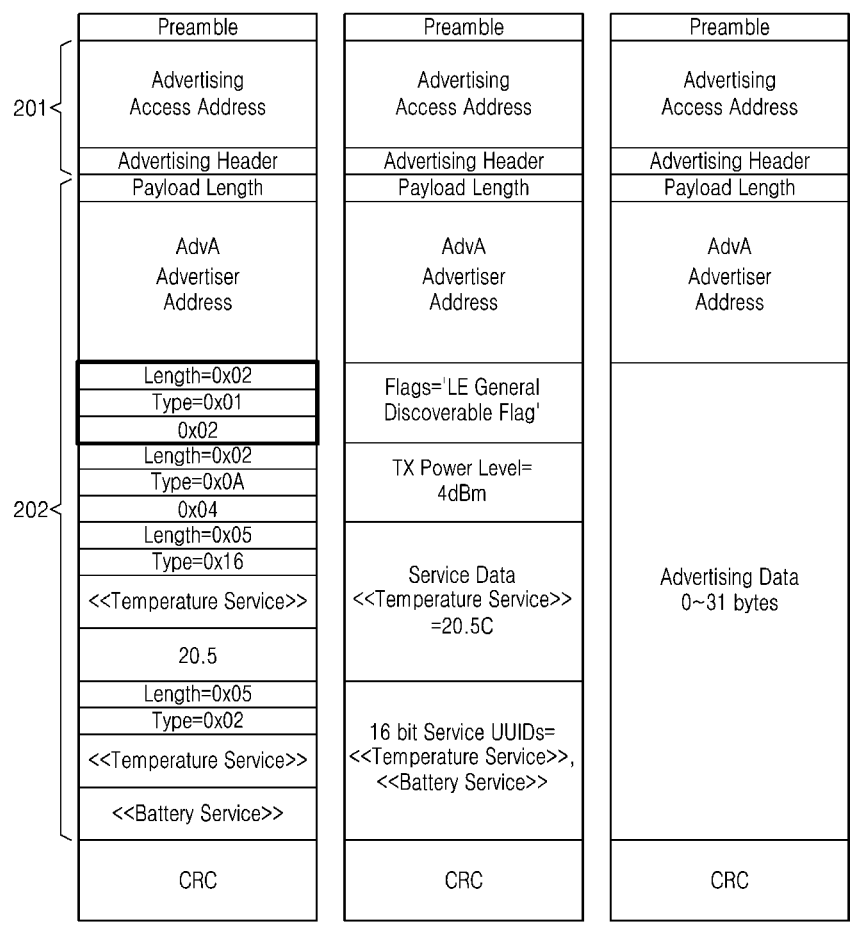
FIG. 2 a diagram for explaining a Bluetooth Low Energy (BLE) packet according to an embodiment of the present disclosure.

FIG. 2 is a diagram for explaining a BLE packet according to an embodiment of the present disclosure.

Referring to FIG. 2, according to an embodiment of the present disclosure, the BLE packet may include a header part 201 and a payload part 202. According to an embodiment of the present disclosure, the header part 201 of the BLE packet may include a random address field.

Accordingly, according to an embodiment of the present disclosure, the first device 100 may generate a random address and write the generated random address to a random address field of the header part 201. According to an embodiment of the present disclosure, the random address may be 48-bit long.

According to an embodiment of the present disclosure, the payload part 202 of the BLE packet may be 31-bytes long. The first device 100 may not easily transmit a large amount of data due to a limited size of the BLE packet. Referring to FIGS. 3 and 4, the payload part 202 of the BLE packet is described in detail.

Figure 3:
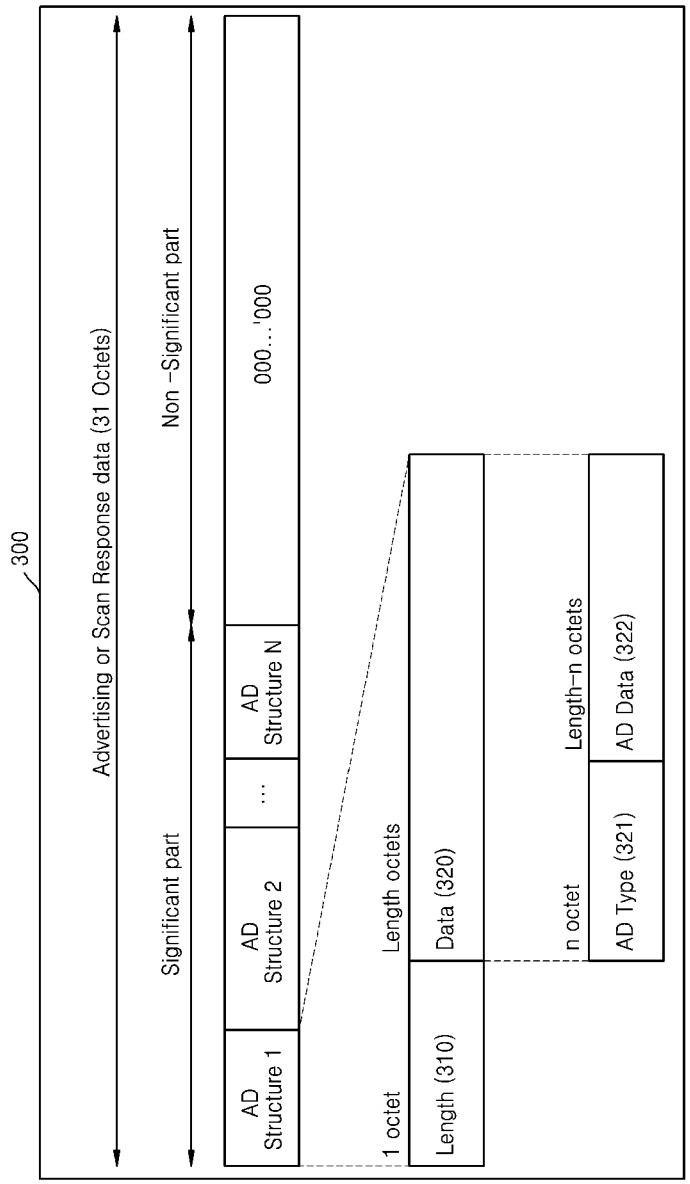
FIG. 3 is a diagram for explaining a payload of a BLE packet according to an embodiment of the present disclosure.

FIG. 3 is a diagram for explaining a payload of a BLE packet according to an embodiment of the present disclosure.

Referring to FIG. 3, a data format 300 represents the payload part 202 which is, except for the header part 201, from the BLE packet that is broadcast by the first device 100. According to an embodiment of the present disclosure, the Advertising Data (AD) that is included in the payload part 202 of the BLE packet may include 31 octets (bytes).

According to an embodiment of the present disclosure, the payload of the BLE packet may include a plurality of AD structures, and each of the AD structures may include a length field 310 and a data field 320. The length field 310 may include information about data length, and the data field 320 may include substantial data to be broadcast by the first device 100.

According to an embodiment of the present disclosure, the data field 320 may include an AD type 321 and an AD data 322. A value for identifying a type of the AD data 322 may be written to the AD type 321. The AD type 321 is described in detail by referring to FIG. 4.

FIG. 4 is a table for explaining an AD type of a BLE packet according to an embodiment of the present disclosure.

Referring to FIG. 4, the AD type 420 that may be included in the BLE packet may be of various structures. For example, the AD type 420 may be « Flags», « Incomplete List of 16-bit Service Class UUIDs», « Complete List of 16-bit Service Class UUIDs», « Incomplete List of 32-bit Service Class UUIDs», « Complete List of 32-bit Service Class UUIDs», « Incomplete List of 128-bit Service Class UUIDs», « Complete List of 128-bit Service Class UUIDs », « Shortened Local Name», « Complete Local Name», « TX Power Level», « Class of Device», « Simple Pairing Hash C», « Simple Pairing Randomizer R», « Device ID », « Security Manager TK Value», « Security Manager Out of Band Flags», « Slave Connection Interval Range», « List of 16-bit Service Solicitation UUIDs», « List of 128-bit Service Solicitation UUIDs», « Service Data», « Public Target Address», « Random Target Address», « Appearance», « Manufacturer Specific Data», or the like.

Each of the AD type 420 may be expressed as a preset value 410, and the value 410 is written to the BLE packet so that a scanner, for example, the second device 200 may identify the AD type 420. One of ordinary skill in the art may clearly understand a definition 430 of the AD type 420, from the table illustrated in FIG. 4. Thus, a detailed description of the definition 430 of the AD type 420 is not provided here.

Hereinafter, a method of generating a random address that includes filtering information, for example, service identification information and broadcasting a BLE packet that includes a random address is described in detail by referring to FIG. 5. The method is performed by the first device 100.

Figure 5:
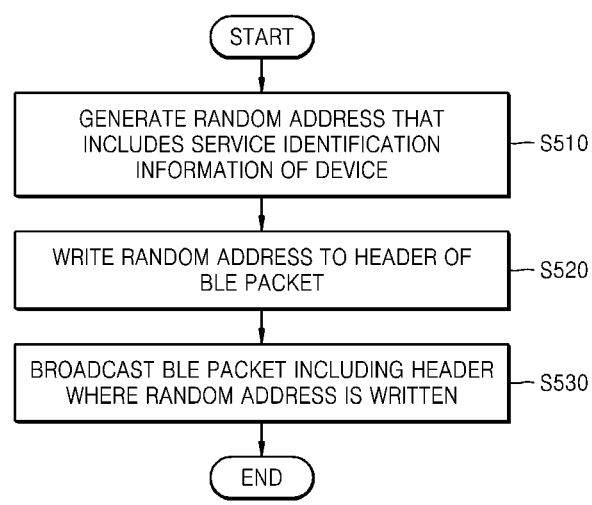
FIG. 5 is a flowchart illustrating a method of broadcasting a BLE packet according to an embodiment of the present disclosure.

FIG. 5 is a flowchart illustrating a method of broadcasting a BLE packet according to an embodiment of the present disclosure. The method is performed by the device 100.

In operation S510, the first device 100 may generate a random address that includes service identification information of the first device 100.

According to an embodiment of the present disclosure, a random address of the BLE packet may be information used by the second device 200 in order to access or connect to the first device 100. According to an embodiment of the present disclosure, since a random address of the BLE packet is not a unique value, the random address may be generated or updated by the first device 100.

According to an embodiment of the present disclosure, service identification information may be information for identifying a service that is provided by the first device 100. For example, the service identification information may include an identifier that represents a mobile hot spot service, a content-sharing service, or a screen mirroring service, an identifier for supported communication standards such as Universal Plug and Play (UPnP) or Digital Living Network Alliance (DLNA), an application or a program that is necessary for communication connection. However, the service identification information is not limited thereto.

Service identification information may correspond to a certain communication connection service. According to an embodiment of the present disclosure, service information, which includes an application that is necessary for a particular communication connection service, a communication method, or a protocol, may be mapped with the service identification information and thus, may be pre-set or reserved. The service information that corresponds to the service identification information, (for example, a communication connection service that is represented by service identification information) may be pre-stored in a memory included in devices that will participate in the communication service, for example, the second device 200.

Service identification information of the first device 100 may include information for switching the AP in the second device 200 that receives the BLE packet from a sleep mode to an awake mode. For example, whole service identification information of the first device 100 may be used as filtering information for changing an operation mode of the AP in the second device 200. Alternately, a part of the service identification information of the first device 100 may be used as filtering information for changing an operation mode of the AP in the second device 200.

According to an embodiment of the present disclosure, the first device 100 may generate a hash value for service identification information by using a hash algorithm. Additionally, the first device 100 may generate a random address by using the generated hash value. This is described with reference to FIG. 6.

Figure 6:
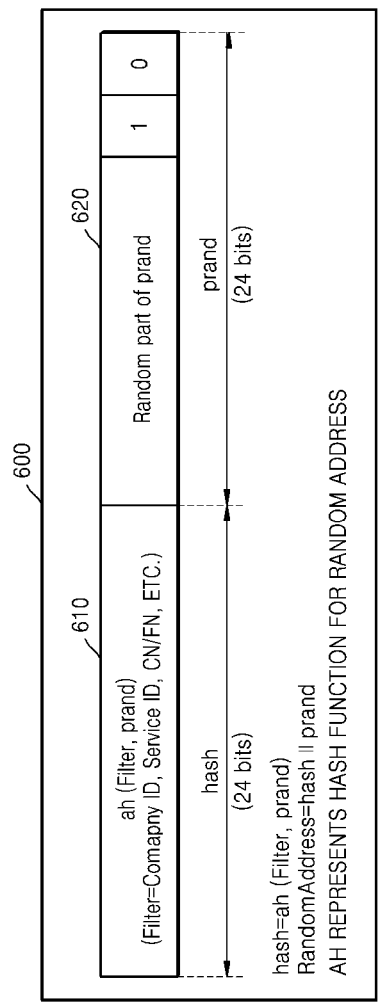
FIG. 6 is a diagram for explaining a random address according to an embodiment of the present disclosure.

FIG. 6 is a diagram for explaining a random address 600 according to an embodiment of the present disclosure. A case in which a total length of the random address 600 is 48 bits is described as an example.

Referring to FIG. 6, the random address 600 may include a hash value 610 for service identification information of the first device 100 and a random value 620 of a certain number of bits long. For example, the first device 100 may generate the 24 bit-long hash value 610 for service identification information by using a certain hash function. Additionally, the first device 100 may generate a 24 bit-long random value 620 in order to fill a remaining part of the random address 600 by using a random function.

In a case in which the hash value 610 and the random value 620 are respectively 24 bits long is described as an example. However, various embodiments of the present disclosure are not limited thereto. For example, the hash value may be 18 bits long, and the random value 620 may be 30 bits long.

According to an embodiment of the present disclosure, the first device 100 may generate a random address that further includes company identification information. For example, the first device 100 may generate the hash value 610 for service identification information and company identification information, and generate a random address by adding the random value 620 to the generated hash value 610.

According to another embodiment of the present disclosure, the first device generates a random address that does not include service identification information, but includes company identification information.

According to an embodiment of the present disclosure, the first device 100 may generate a random address that further includes information about a total number of packets and identification information about a current packet. For example, in the case that a number of all packets that is broadcast by the first device 100 is 4 and a current packet is a second packet, information such as 'Current Number/Final Number=2/4' may be converted into the hash value 610. Additionally, the first device 100 may generate a random address that includes the hash value 610 which is obtained by the converting.

Referring to FIG. 5, in operation S520, the first device 100 may write the random address to the header of the BLE packet.

For example, the first device 100 may write the random address, which includes the service identification information, to a random address field of the header. According to an embodiment of the present disclosure, the random address field may include a first part to which a hash value is written and a second part to which a random value is written.

In operation S530, the first device 100 may broadcast or transmit the BLE packet to which the random address is written.

According to an embodiment of the present disclosure, the first device 100 may broadcast the BLE packet at a certain interval, for example, 100 ms. According to an embodiment of the present disclosure, a certain interval of broadcasting may be adjusted by the first device 100 or a user.

If the first device 100 generates a plurality of BLE packets, the first device 100 may sequentially broadcast the plurality of BLE packets.

Figure 7:
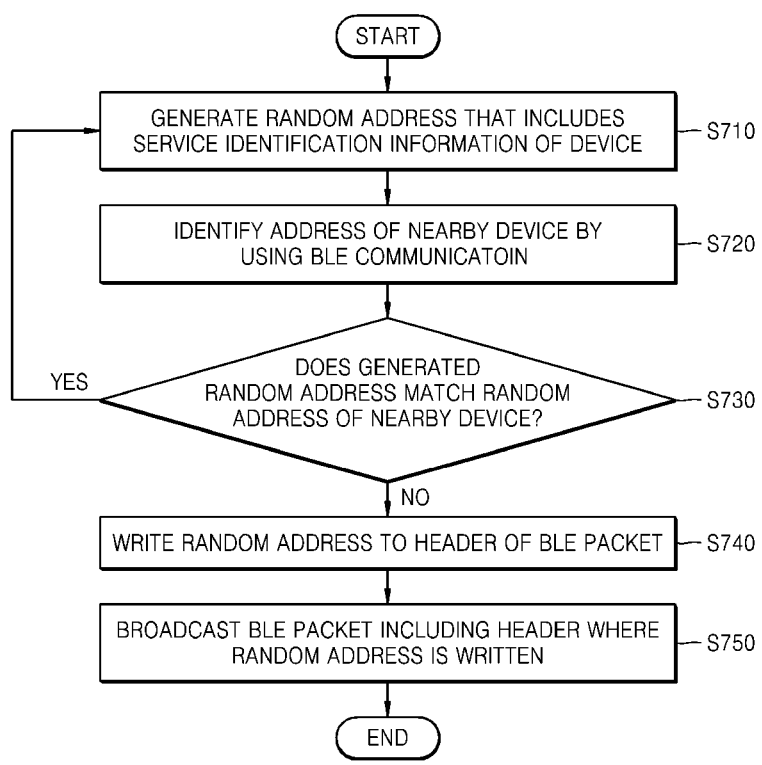
FIG. 7 is a flowchart illustrating a method of generating a random address according to an embodiment of the present disclosure.

FIG. 7 is a flowchart illustrating a method of generating a random address according to an embodiment of the present disclosure.

In operation 710, the first device 100 may generate a random address that includes service identification information of the first device 100. Operation S710 corresponds to operation S510 of FIG. 5. Thus, a detailed description thereof will not be repeated.

In operation S720, the first device 100 may identify an address of a peripheral apparatus by using a BLE communication.

For example, the first device 100 may discover and scan a nearby apparatus by performing BLE scanning. The first device 100 may receive an advertising packet that is broadcast by the nearby apparatus. Additionally, the first device 100 may identify an address of the peripheral apparatus by extracting a random address from the received advertising packet.

In operation S730, the first device 100 may determine whether the generated random address matches a random address of the peripheral apparatus.

As a result of the determining, if the generated random address matches the random address of the peripheral apparatus, the first device 100 may generate other random address at operation S710. According to an embodiment of the present disclosure, a hash value for service identification information may not be changed. Thus, the first device 100 may generate only other random value from the random address, except for the hash value.

For example, when a random address that is generated by the first device 100 is 001247184818 and a random address of the discovered and scanned another device is also 001247184818, the first device 100 may generate other value for a least significant part of the random address, except for the 24-bits long hash value. For example, the regenerated random address may be 001247103456.

Otherwise, in operation S743, if the generated random address does not match a random address of the peripheral apparatus, the first device 100 may write the generated random address to the header of the BLE packet in operation S740.

In operation S750, the first device 100 may broadcast the BLE packet to which the random address is written.

Operations S740 and S750 correspond to operations S520 and S530 of FIG. 5. Thus, a detailed description thereof will not be repeated. According to various embodiments, an order of operations S710 through S750 may be changed, or some operations may not be performed.

Hereinafter, a method in which the second device 200 receives the BLE packet and, based on filtering information that is included in the BLE packet, adjusts an operation mode of the AP is described in detail with reference to FIG. 8.

Figure 8:
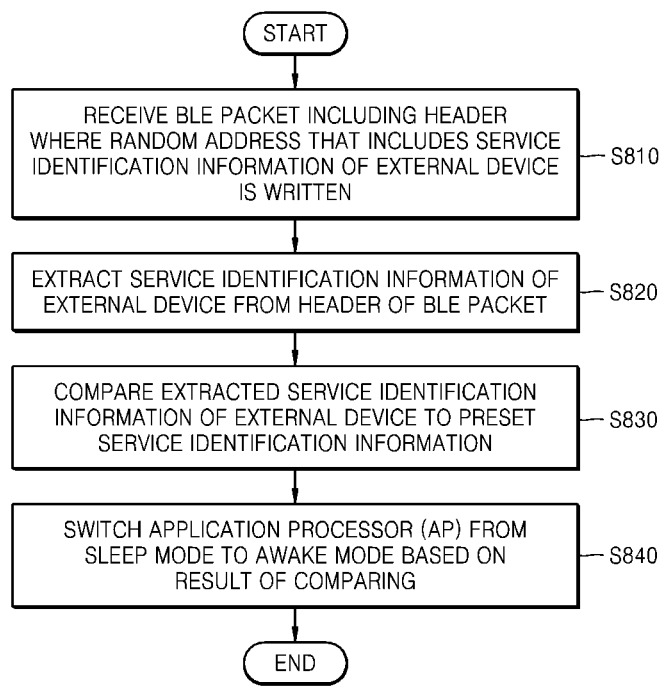
FIG. 8 is a flowchart illustrating a method of adjusting an operation mode of an Application Processor (AP) according to an embodiment of the present disclosure.

FIG. 8 is a flowchart illustrating a method of adjusting an operation mode of the AP according to an embodiment of the present disclosure.

In operation S810, the second device 200 may receive the BLE packet from the first device 100. According to an embodiment of the present disclosure, a random address, which includes service identification information of the first device 100, may be written to the header of the received BLE packet. The random address may include a hash value for service identification information of the first device 100 and a random value of a certain number of bits long.

According to another embodiment of the present disclosure, a header of the BLE packet, which is received from the first device 100, may further include at least one of company identification information of the first device 100, information about a total number of packets and identification information about a current packet.

In operation S830, the second device 200 may extract service identification of the first device 100 from the header of the BLE packet. For example, the second device 200 may extract 24 bit-long service identification information from a random address field of the header of the BLE packet.

According to another embodiment of the present disclosure, the second device 200 may further extract at least one of company identification information of the first device 100, information about a total number of packets and identification information about a current packet from the header of the BLE packet.

In S830, the second device 200 may compare the extracted service identification information of the first device 100 to service identification information that is preset with regard to a change in an operation mode of the AP.

According to an embodiment of the present disclosure, the service identification information, which is pre-set with regard to a change in an operation mode of the AP at the second device 200, may include a filtering value for waking up the AP in a sleep mode.

According to an embodiment of the present disclosure, the second device 200 may set service identification information with regard to a change in the operation mode of the AP. According to an embodiment of the present disclosure, the second device 200 may set service identification information with regard to a change in the operation mode of the AP based on a user input or selection.

For example, if the second device 200 is to use a mobile hot-spot service provided by an external device, the second device 200 may set service identification information, which corresponds to the mobile hot-spot service, as filtering reference identification information with regard to a change in an operation mode of the AP.

According to another embodiment of the present disclosure, the second device 200 may compare the extracted service identification information of the first device 100 to service identification information that is preset with regard to a change in an operation mode of the AP.

In operation S840, based on a result of the comparing, the second device 200 may switch the AP from the sleep mode to the awake mode.

For example, if the extracted service identification information of the first device 100 matches the preset service identification information or a degree of a similarity between the extracted service identification information of the first device 100 and the preset service identification information is a threshold value, for example, 90% or more, the second device 200 may switch the AP from the sleep mode to the awake mode.

Conversely, if the extracted service identification information of the first device 100 does not match the preset service identification information or a degree of a similarity between the extracted service identification information of the first device 100 and the preset service identification information is less than a threshold value, for example, 90%, the second device 200 may maintain the AP in the sleep mode.

According to another embodiment of the present disclosure, if the extracted service identification information of the first device 100 matches service identification information that is preset with regard to a change in an operation mode of the AP, or if a degree of a similarity between service identification information of the first device 100, which is extracted from a header of the BLE packet, and service identification information, which is preset with regard to a change in an operation mode of the AP, is a threshold value or more, for example, 90% or more, the second device 200 may switch the AP from the sleep mode to the awake mode.

Accordingly, according to an embodiment of the present disclosure, the second device 200 wakes up the AP only if a predetermined event, for example, receiving of the BLE packet that includes preset service identification information, has occurred. Thus, standby power consumed by the AP may be minimized.

According to various embodiments of the present disclosure, operations S810 through S840 may be performed in a different order, or some operations may not be performed at all.

Figure 9:
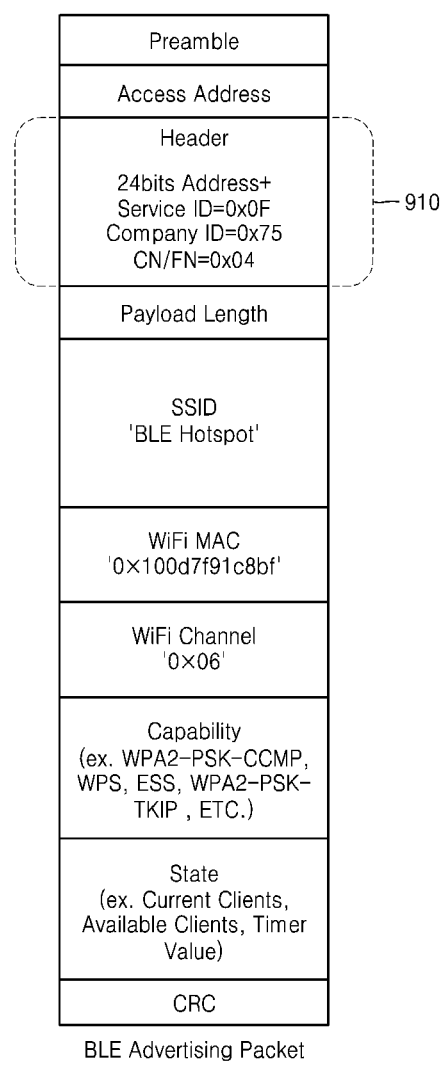
FIG. 9 is a diagram for explaining an operation of extracting filtering information from a BLE packet according to an embodiment of the present disclosure.

FIG. 9 is a diagram for explaining an operation of extracting filtering information from a BLE packet 900 according to an embodiment of the present disclosure.

Referring to FIG. 9, it is assumed that the first device 100 provides a mobile hot-spot service by using BLE communication. According to an embodiment of the present disclosure, the first device 100 may broadcast the BLE packet 900 which includes service identification information that corresponds to a mobile hot-spot service, for example, service ID=0x0F in a header 910.

In this case, the second device 200 may receive the BLE packet that is broadcast by the first device 100. The second device 200 may extract service identification information, for example, service ID=0x0F, company identification information, for example, company ID=0x75, or information about a total number of packets and identification information about a current packet, for example, CN/FN=0x04.

If service identification information that corresponds to a mobile hot-spot service in the second device 200 is set as filtering-based identification information relating to a change of an operation mode of the AP, service identification information that is extracted from the header, for example, service ID=0x0F may match the filtering reference identification information. Since the service identification information that is extracted from the header, for example, service ID=0x0F, matches the filtering-based identification information, the second device 200 may switch the AP from the sleep mode to the awake mode.

Accordingly, according to an embodiment of the present disclosure, until the first device 100 that provides a mobile hot-spot service is discovered and scanned, the second device 200 maintains the AP in the sleep mode. If the first device 100 that provides a mobile hot-spot service is discovered and scanned, the second device 200 may wake up the AP. In other words, if the AP is unnecessary, the second device 200 may reduce standby power consumed by the AP by setting an operation mode of the AP to the sleep mode.

Figure 10:
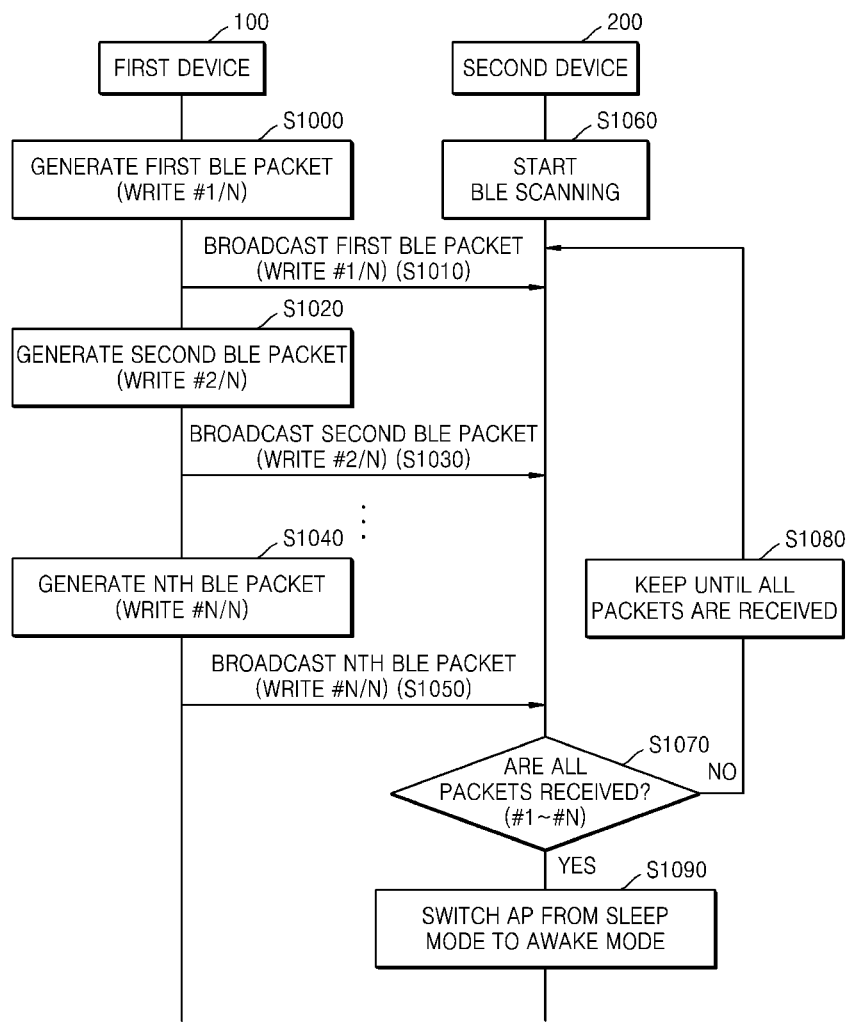
FIG. 10 is a flowchart illustrating a method of broadcasting a plurality of the BLE packets according to an embodiment of the present disclosure.

FIG. 10 is a flowchart illustrating a method of broadcasting a plurality of the BLE packets according to an embodiment of the present disclosure.

Referring to FIG. 10, a case in which the first device 100 generates a plurality of BLE packets in order to overcome a length limitation of the BLE packet, that is, a payload of 31 bytes, is described as an example.

In operation S1000, the first device 100 may generate a first BLE packet. The first BLE packet may be a first packet from among all packets. According to an embodiment of the present disclosure, the first device 100 may generate the first BLE packet by writing information about a total number of packets and identification information about a current packet, for example, #1/N to a header or payload of the first BLE packet.

In operation S1010, the first device 100 may broadcast the first BLE packet to which information about a number of all the packets and identification information of a current packet, for example, #1/N, is written. The first device 100 may broadcast the first BLE packet at a certain interval.

In operation S1020, the first device 100 may generate a second BLE packet. The second BLE packet may be a second packet from among all the packets. According to an embodiment of the present disclosure, the first device 100 may generate the second BLE packet by writing information about a total number of packets and identification information about a current packet, for example, #2/N, to a header or payload of the second BLE packet.

In operation S1030, the first device 100 may broadcast the second BLE packet to which information about a total number of packets and identification information about a current packet, for example, #2/N, is written. The first device 100 may broadcast the second BLE packet at a certain interval.

In operation S1040, the first device 100 may generate an Nth BLE packet. The Nth BLE packet may be a last packet from among all the packets. According to an embodiment of the present disclosure, the first device 100 may generate the Nth BLE packet by writing information about a total number of packets and identification information about a current packet, for example, #N/N, to a header or payload of the Nth BLE packet.

In operation S1050, the first device 100 may broadcast the Nth BLE packet, to which information about a number of all the packets and identification information of a current packet, for example, #N/N, is written. The first device 100 may broadcast the Nth BLE packet at a certain interval.

According to an embodiment of the present disclosure, the first device 100 may generate the first through Nth BLE packets at the same time or one by one. Additionally, the first device 100 may broadcast the first through Nth BLE packets sequentially or in a random order.

In operation S1060, the second device 200 may start BLE scanning. The second device 200 may receive the BLE packet which is broadcast by the first device 100. The second device 200 may receive a plurality of the BLE packets, that is, the first through Nth BLE packets that are broadcast by the first device 100.

In operation S1070, the second device 200 may determine whether all packets broadcast by the first device 100 are received. For example, according to an embodiment of the present disclosure, the second device 200 may extract information about a number of all the packets and identification information of a current packet from a header or payload of the BLE packet. Additionally, the second device 200 may determine whether all the packets broadcast by the first device 100 have been received based on the extracted information about a total number of packets and identification information about a current packet.

In operation S1080, as a result of the determining, if all the packets are not received, the second device 200 may continue the BLE scanning until all the packets are received. The second device 200 may maintain the AP in the sleep mode.

In operation S1090, as a result of the determining, if all the packets are received from the first device 100, the second device 200 may switch the AP from the sleep mode to the awake mode.

According to various embodiments of the present disclosure, the operations S1000 through S1090 may be performed in a different order, or some operations may not be performed at all.

Figure 11:
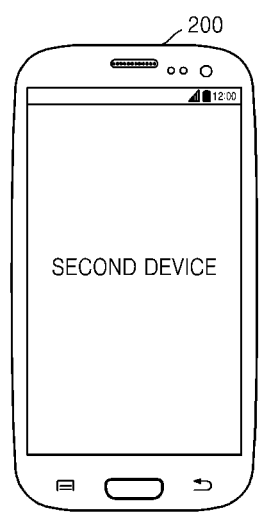
FIG. 11 is a diagram illustrating an example of a BLE packet to which information about a total number of all packets, for example, a final number of all packets and identification information of a current packet, for example, a current number of a packet are written, according to an embodiment of the present disclosure.

FIG. 11 is a diagram illustrating an example of a BLE packet to which information about a total number of all packets, for example, a final number of all packets and identification information of a current packet, for example, a current number of a packet are written, according to an embodiment of the present disclosure.

Referring to FIG. 11, according to an embodiment of the present disclosure, the first device 100 may generate four relevant BLE packets. For example, the first device 100 may generate a first BLE packet 1110, a second BLE packet 1120, a third BLE packet 1130, and a fourth BLE packet 1140. A header or a payload of each of the BLE packets may include information about a number of all packets, for example, 4, and identification information about a current packet.

The first device 100 may broadcast the first BLE packet 1110, the second BLE packet 1120, the third BLE packet 1130, and the fourth BLE packet 1140. The second device 200 may receive the first BLE packet 1110, the second BLE packet 1120, the third BLE packet 1130, and the fourth BLE packet 1140.

If the second device 200 receives the first BLE packet 1110 first, the second device 200 identifies the information about a total number of packets and identification information about a current packet which are written to a header or a payload of the first BLE packet 1110. Thus, the second device 200 may identify that a number of all BLE packets that are broadcast by the first device 100 is 4, and the first BLE packet 1110 is a first packet from among all the BLE packets.

Accordingly, the second device 200 may maintain an operation mode of the AP at a sleep mode until the second BLE packet 1120, the third BLE packet 1130, and the fourth BLE packet 1140, in addition to the first BLE packet 1110, are all received. If the first BLE packet 1110, the second BLE packet 1120, the third BLE packet 1130, and the fourth BLE packet 1140 are all received, the second device 200 may switch the AP to the awake mode.

In the awake mode, the AP may analyze the first BLE packet 1110, the second BLE packet 1120, the third BLE packet 1130, and the fourth BLE packet 1140 and, based on a result of the analyzing, may execute at least one application. An application is a set of computer programs designed for executing a particular operation or job.

According to an embodiment of the present disclosure, the second device 200 wakes up the AP only when all packets broadcast by the first device 100 are received. Thus, standby power consumed by the AP may be minimized.

Figure 12:
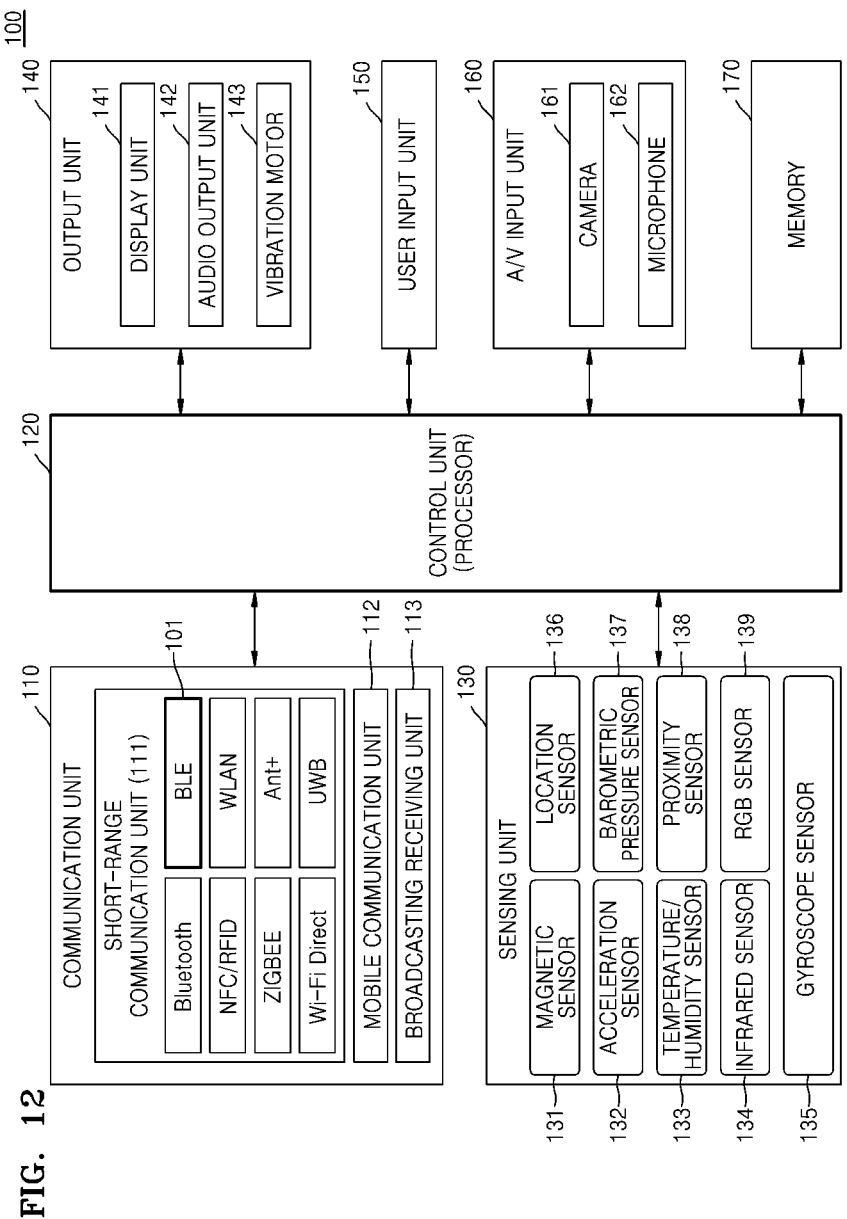
FIG. 12 is a block diagram illustrating a configuration of a first device according to an embodiment of the present disclosure.

FIG. 12 is a block diagram illustrating a configuration of a first device 100 according to an embodiment of the present disclosure.

Referring to FIG. 12, according to an embodiment of the present disclosure, the first device 100 may include a communication unit 110, a controller 120, a sensing unit 130, an output unit 140, a user input unit 150, an Audio-Video (A/V) input unit 160, and a memory 170. However, the units illustrated in FIG. 12 are not always essential units. The first device 100 may be implemented by using more or less units than those illustrated in FIG. 12.

Hereinafter, the units illustrated in FIG. 12 are described.

The communication unit 110 may include one or more units for communication between the first device 100 and the second device 200 or between the first device 100 and a server. For example, the communication unit 110 may include a short-range communication unit 111, a mobile communication unit 112, and a broadcasting receiving unit 113.

The short-range communication unit 111 may include a Bluetooth communication unit, a BLE communication unit 101, a Near-Field Communication/Radio-Frequency Identification (NFC/RFID) unit, a Wireless Local Area Network (WLAN) Wi-Fi communication unit, a Zigbee communication unit, an Infrared Data Association (IrDA) communication unit, a Wi-Fi Direct (WFD) communication unit, a Ultra WideBand (UWB) communication unit, an Ant+ communication unit, but is not limited thereto.

The WLAN Wi-Fi communication unit may operate in an infrastructure mode in which an access point for transmitting a wireless signal exchanges data with a plurality of terminals that are present within a certain range or an ad hoc mode in which terminals exchange data in a Peer-to-Peer (P2P) fashion without having to use the access point.

Bluetooth is a standard for wireless communication between wireless communication devices with lower power in a short range. A UWB is a wireless technology for transmitting large-amount of digital data over a wide spectrum of frequency with low power for a short distance.

WFD is a new version of a Wi-Fi technology and allows direct communication between devices. In other words, if devices support WFD, the devices may communicate with each other without having to use a hotspot, a router, or an access point.

Zigbee is one of the IEEE 802.15.4 standards that support short-range communication. Zigbee is a technology for short-range communication within a distance of 10 to 20 m in a wireless networking field such as home or an office, and ubiquitous computing.

NFC is a type of RFID. NFC refers to a non-contact short-range wireless communication using a frequency band of 13.56 MHz. By using an NFC technology, Data may be exchanged between terminals within a distance 10 cm. NFC may include a P2P mode, a Reader/Writer (R/W) mode, or a card emulation mode. Ant+ refers to a wireless communication technology using a 2.4 GHz frequency band with low power consumption for a short distance.

The BLE communication unit 101 may broadcast a BLE packet to which a random address is written. The random address may include service identification information of the first device 100. The service identification information of the first device 100 may include information used to switch the AP from the sleep mode to the awake mode in the second device 200 that receives the BLE packet.

The mobile communication unit 112 transceives a wireless signal to and from with at least one of a base station, an external terminal, and a server on a mobile communication network. The wireless signals may include a voice call signal, a video phone call signal or various forms of data used to transceive text or multimedia messages.

The broadcasting receiving unit 113 receives broadcasting signals and/or broadcasting-related information from outside, via a broadcasting channel. The broadcasting channel may be a satellite channel and a terrestrial broadcast channel. According to embodiments, the first device 100 may not include a broadcasting receiving unit 113.

The communication unit 110 may include a first communication module and a second communication module to function as an access point. The first communication module and the second communication module may be one of short-range communication modules. For example, the first communication module may be a BLE communication module, and a second communication module may be a Wi-Fi communication module or a Bluetooth communication module.

The first communication module may broadcast a BLE packet that includes communication connection information about a second communication method, by using a first communication method. Additionally, the first communication module may receive a request for connection to the first communication method from the second device 200 that has received the BLE packet. The first device 100 may form a first communication link that uses the first communication method, by responding to the request for the connection to the first communication method.

The second communication module may receive a request for connection to the second communication method from the second device 200. The first communication module may form a second communication link that uses the second communication method, by responding to the request for the connection to the second communication method.

The controller 120 generally controls all operations of the first device 100. That is, the controller 120 executes programs stored in the memory 170 so as to control the communication unit 110, the sensing unit 130, the output unit 140, the user input unit 150, and the A/V input unit 160.

The controller 120 may include a sensor hub of a Seamless Sensing Platform (SSP). The sensor hub may be implemented by hardware, software, or a combination of hardware and software. For example, the sensor hub may include a Micro Controller Unit (MCU). According to an embodiment of the present disclosure, the sensor hub may be connected to the sensing unit 130, and collect sensing information from the sensing unit 130.

The controller 120 may generate a random address that includes service identification information of the first device 100, and write the generated random address to the header of the BLE packet.

The controller 120 may generate a random address that further includes company identification information. The controller 120 may generate a random address that further includes information about a total number of packets and identification information about a current packet.

According to an embodiment of the present disclosure, if the generated random address matches a random address of a discovered and scanned another device, the controller 120 may generate other random address.

The controller 120 may write number information of whole packets and identification information of a current packet to the payload of the BLE packet.

The sensing unit 130 may sense a status of the first device 100 or a status near the first device 100, and transmit the sensed information to the controller 120.

The sensing unit 130 may include at least one of a magnetic sensor 131, an acceleration sensor 132, a temperature/humidity sensor 133, an infrared sensor 134, a gyroscope sensor 135, a location sensor 136, for example, a Global Positioning System (GPS), a barometric pressure sensor 137, a proximity sensor 138, and a Red-Green-Blue (RGB) sensor (illuminance sensor) 139, but is not limited thereto. Functions of the respective sensors may be inferred from the name of the modules by those of ordinary skill in the art. Thus, a detailed description thereof will not be provided here.

The output unit 140 outputs an audio signal, a video signal, or a vibration signal, and may include a display unit 141, an audio output unit 142, and a vibration motor 143.

The display unit 141 displays and outputs information processed by the first device 100. For example, while in a phone call mode, the display unit 141 may display a User Interface (UI) or a Graphic User Interface (GUI) related to the phone call. If the second device 200 is not discovered and scanned, the display unit 141 may display a connection (or discovery and scanning) failure notification message on a screen. The display unit 141 may display information about a status of connection to the second device 200. Additionally, the display unit may provide a button for activating a mobile hotspot function on an environment setting window.

If the display unit 141 and a touch pad form a layered structure to constitute a touch screen, the display unit 141 may be also used as an input device as well as an output unit. The display unit 141 may include at least one from among a Liquid Crystal Display (LCD), a Thin-Film Transistor-Liquid Crystal Display (TFT-LCD), an Organic Light-Emitting Diode (OLED), a flexible display, a 3-Dimensional (3D) display, and an electrophoretic display. According to an implementation type of the first device 100, the first device 100 may include two or more display units 141.

The audio output unit 142 outputs audio data which is received from the communication unit 110 or stored in the memory 170. The audio output unit 142 outputs an audio signal related to functions performed by the first device 100, for example, a call signal reception sound, a message reception sound, etc. The sound output unit 142 may include a speaker, a buzzer, and so on.

The vibration motor 143 may output a vibration signal. For example, the vibration motor 143 may output a vibration signal which corresponds to an output of audio data or video data, for example, a call signal reception sound, a message reception sound, etc. Additionally, the vibration motor 143 may output a vibration signal if a touch is input to a touch screen.

The user input unit 150 is a unit for inputting data so that the user may control the first device 100. For example, the user input unit 150 may include a key pad, a dome switch, a touch pad, which may be a capacitive overlay type, a resistive overlay type, an infrared beam type, a surface acoustic wave type, an integral strain gauge type, or a piezo electric type, a jog wheel, or a jog switch, but is not limited thereto.

The A/V input unit 160 functions to input audio or video signals, and may include a camera 161 and a microphone 162. In a video phone mode or a photographing mode, the camera 161 may obtain an image frame such as a still image or a moving image through an image sensor. An image captured through the image sensor may be processed through the controller 120 or an additional image processing unit (not illustrated).

The image frame processed by the camera 161 may be stored in the memory 170 or transmitted to the outside through the communication unit 110. The A/V input unit 160 may include two or more cameras 161 according to a configuration type of a terminal.

The microphone 162 receives an external sound signal and processes the external sound signal into electrical voice data. For example, the microphone 162 may receive a sound signal from an external device or a speaker. The microphone 162 may employ various noise removal algorithms for removing noise that may be generated in a process of receiving an external sound signal.

The memory 170 may store a program for processing and controlling the controller 120. The memory 170 may also store data which is input or output, such as service identification information, company identification information, information about a total number of packets, identification information about a current packet. The memory 170 may include at least one storage medium from among a flash memory, a hard disk, a multimedia card micro, a card-type memory such as a Secure Digital (SD) or extreme Digital (XD) memory, a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disc. Additionally, the first device 100 may operate a web storage for performing a storage function of the memory 170 on the internet.

The programs stored in the memory 170 may be classified into a plurality of modules according to functions. For example, the programs may be classified into a UI module, a camera module, a touch screen module, and an alarm module.

The UI module may provide a specialized UI or GUI which interworks with the first device 100 according to applications. The touch screen module may detect a touch gesture on a touch screen by a user and transmit information about the touch gesture to the controller 120. According to an embodiment of the present disclosure, the touch screen module may recognize and analyze a touch code. The touch screen module may be formed of additional hardware that includes a controller.

Various types of sensor may be disposed inside or near the touch screen, in order to detect a touch or a proximity touch on the touch screen. An example of a sensor for detecting a touch on the touch screen may be a tactile sensor. The tactile sensor is a sensor that allows the touch screen to detect a contact with a specific object. The tactile sensor may detect various types of information such as information about a roughness of a contact surface, a hardness of a contact object, or a temperature at a contact point.

Additionally, an example of a sensor for detecting a touch on the touch screen is a proximity sensor.

The proximity sensor is a sensor for detecting an object which is approaching a predetermined detection surface or a neighboring object by using the strength of an electromagnetic field or an infrared light. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor. Touch gestures of a user may include a tap, a touch and hold, a double-tap, a drag, panning, a flick, a drag-and-drop, and a swipe.

A "tap" is a gesture in which a user touches a screen by using a finger or a touch tool, for example, an electronic pen, and immediately lifts it off from the screen without dragging on the screen.

A "touch and hold" is a gesture in which a user touches a screen by using a finger or a touch tool, for example, an electronic pen and holds the touch for more than a critical period of time, for example, 2 seconds. That is, a difference in time between time points of a touch on and a lift-off from the screen is longer than the critical period of time, for example, 2 seconds. If the touch input is held for more than the critical period of time to make a user recognize whether the touch input is a tap or a touch and hold, a feedback signal may be visually, aurally, or tactually provided. The critical period of time may vary according to various embodiments of the present disclosure.

A "double tap" is a gesture in which a user touches a screen twice by using a finger or a touch tool which may be a stylus.

A "drag" is a gesture in which a user touches a screen by using a finger or a touch tool and moves the finger or the touch tool to another location in the screen while holding the touch. When the drag is performed, an object moves, or a panning gesture, which is described below, is performed.

A "panning" gesture is a gesture in which a user performs a drag without selecting an object. As the panning does not select a specific object, an object does not move in a page, and the page moves in the screen or a group of objects moves in the page.

A "flick" is a gesture in which a user performs a drag at a critical speed or at a higher speed, for example, 100 pixels/s, by using a finger or a touch tool. The flick may be distinguished from the drag or the panning based on whether a moving speed of a finger or a touch tool is equal to or higher than the critical speed, for example, 100 pixels/s.

A "drag and drop" is a gesture in which a user drags an object to a predetermined place in a screen by using a finger or a touch tool, and lifts the finger or touch tool off the screen.

A "pinch" is a gesture in which a user touches a screen with two fingers and moves the two fingers in different directions. The pinch may be a pinch-open gesture for zooming-in to an object or a page, or a pinch-close gesture for zooming-out from an object or a page. A zoom-in or zoom-out value is determined according to a distance between the two fingers.

A "swipe" is a gesture for touching an object in a screen by using a finger or a touch tool and moving the finger or the touch tool in a horizontal or vertical direction for a certain distance. Moving in a diagonal direction may not be recognized as a swipe event.

The memory 170 may include a voice recognition module (not illustrated) for recognizing a voice of a user by using a voice recognition engine and transmitting a signal corresponding to the recognized voice to the controller 150.

The alarm module may generate a signal for notifying generation of an event in the first device 100. Examples of the event generated in the first device 100 may include call signal reception, message reception, key signal input, and schedule notification. The alarm module may output an alarm signal in a form of a video signal via the display unit 141 or in a form of an audio signal via the audio output unit 142. The alarm module may also output an alarm signal in a form of a vibration signal via the vibration motor 143.

Figure 13:
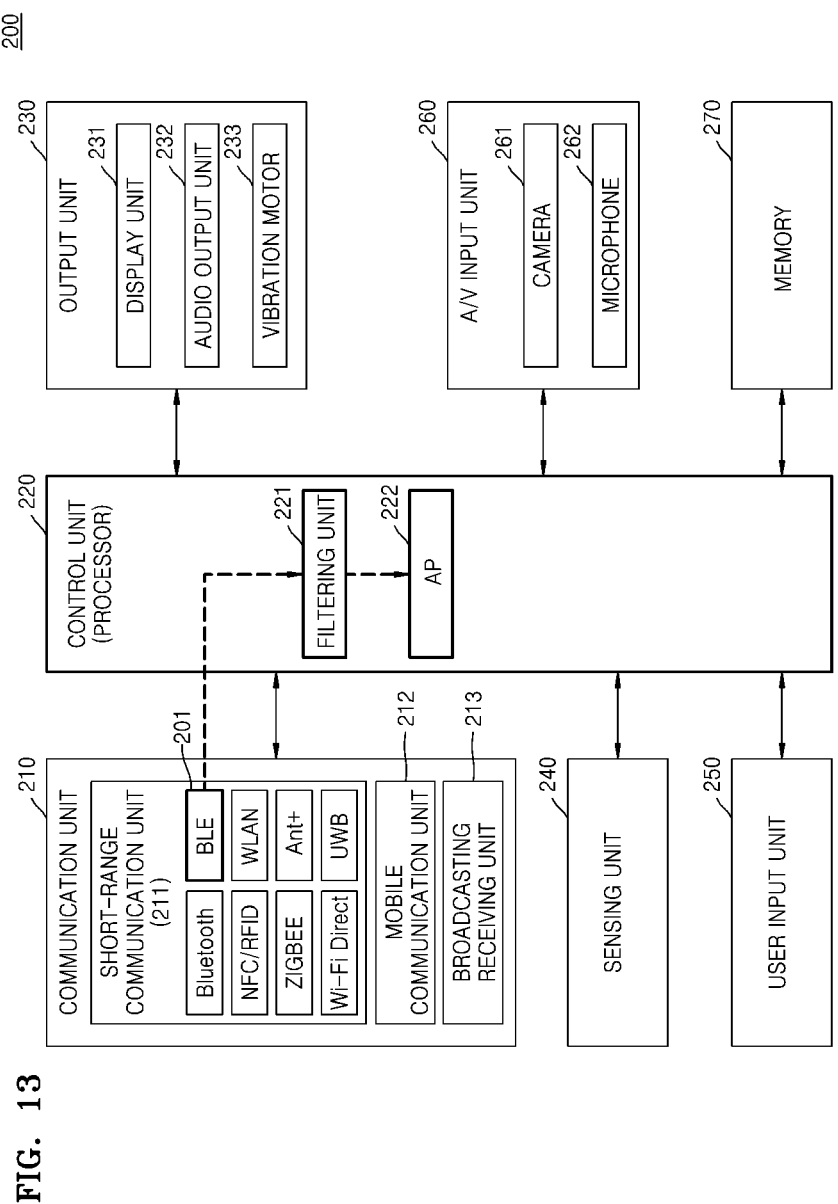
FIG. 13 is a block diagram illustrating a configuration of a second device according to an embodiment of the present.

FIG. 13 is a block diagram illustrating a configuration of a second device according to an embodiment of the present disclosure.

Referring FIG. 13, according to an embodiment of the present disclosure, the second device 200 may include a communication unit 210, a controller 220, an output unit 230, a sensing unit 240, a user input unit 250, an A/V input unit 260, and a memory 270. However, the units illustrated in FIG. 13 are not always essential units. The second device 200 may be implemented by using more or less units than those illustrated in FIG. 13.

Hereinafter, the units, illustrated in FIG. 13, are described.

The communication unit 210 may include one or more units for communication between the second device 200 and the first device 100 or between the second device 200 and a server. For example, the communication unit 210 may include a short-range communication unit 211, a mobile communication unit 212, and a broadcasting receiving unit 213.

The short-range communication unit 211 may include a Bluetooth communication unit, a BLE communication unit 201, a NFC/RFID unit, a WLAN Wi-Fi communication unit, a Zigbee communication unit, an IrDA communication unit, a WFD communication unit, a UWB communication unit, an Ant+ communication unit, but is not limited thereto.

The BLE communication unit 201 may receive from the first device 100a BLE packet to which a random address that includes service identification information of the first device 100 is written.

The BLE communication unit 201 may receive from the first device 100 a BLE packet to which a random address that includes company identification information of the first device 100 is written.

The BLE communication unit 201 may also receive from the first device 100 a BLE packet that includes in a header or a payload thereof information about a total number of packets and identification information about a current packet which are broadcast by the first device 100.

The BLE communication unit 201 may receive a plurality of BLE packets that are broadcast by the first device 100.

The mobile communication unit 212 transceives a wireless signal with at least one of a base station, an external terminal, and a server on a mobile communication network. The wireless signals may include a voice call signal, a video phone call signal or various forms of data used to transceive text or multimedia messages.

The broadcasting receiving unit 213 receives broadcasting signals and/or broadcasting-related information from outside via a broadcasting channel. The broadcasting channel may be a satellite channel or a terrestrial broadcast channel. According to embodiments, the first device 100 may not include a broadcasting receiving unit 213.

The controller 220 generally controls all operations of the second device 200. That is, the controller 220 executes programs stored in the memory 270 so as to control the communication unit 210, the output unit 230, the sensing unit 240, the user input unit 250, and the A/V input unit 260.

According to an embodiment of the present disclosure, the controller 220 may include a filtering unit 221 and an AP 222. According to an embodiment of the present disclosure, the filtering unit 221 may be in a form of an MCU such as a sensor hub of an SSP. Additionally, according to another embodiment of the present disclosure, the filtering unit 221 may constitute a BLE chipset together with the BLE communication unit 201.

The filtering unit 221 may be connected to the BLE communication unit 201 and receive from the BLE communication unit 201a BLE packet which is received by the BLE communication 201. The filtering unit 221 may extract service identification information of the first device 100 from the header of the BLE packet. The filtering unit 221 may compare the extracted service identification information of the first device 100 to service identification information that is present with regard to a change in an operation mode of the AP 222. Based on a result of the comparing, the filtering unit 221 may transmit an awake mode switching command to the AP 222. For example, if the extracted service identification information of the first device matches the preset service identification information, or if a degree of similarity therebetween is a threshold value or more, the filtering unit 221 may transmit the awake mode switching command to the AP 222.

The filtering unit 221 may further extract company identification information of the first device 100 from the header of the BLE packet. The filtering unit 221 may compare the extracted company identification information of the first device 100 to service identification information that is preset with regard to a change in an operation mode of the AP.

The filtering unit 221 may further extract information about a total number of packets and identification information about a current packet from the BLE packet. Based on the extracted information about a total number of packets and identification information about a current packet, the filtering unit 221 may determine whether all the packets are received. As a result of the determining, if all the packets are received, the filtering unit 221 may transmit an awake mode switching command to the AP 222.

According to an embodiment of the present disclosure, based on the awake mode switching command that is received from the filtering unit 201, the AP 222 may switch from the sleep mode to the awake mode. According to an embodiment of the present disclosure, the AP 222 may control execution of various applications that are stored in the memory 270.

The output unit 230 functions to output an audio signal, a video signal, or a vibration signal, and may include a display unit 231, an audio output unit 232, and a vibration motor 233.

The display unit 231 displays and outputs information processed by the second device 200. For example, while in a phone call mode, the display unit 231 may display a UI or a GUI related to the phone call. If the first device 100 is not discovered and scanned, the display unit 231 may display a connection (or discovery and scanning) failure notification message on a screen. If the first device 100 is discovered and scanned, the display unit 231 may display identification information of the first device 100. The display unit 231 may display information about a status of connection to the first device 100.

If the display unit 231 and a touch pad form a layered structure to constitute a touch screen, the display unit 231 may be also used as an input device as well as an output unit. The display unit 231 may include at least one from among a LCD, a TFT-LCD, an OLED, a flexible display, a 3D display, and an electrophoretic display. According to an implementation type of the second device 200, the second device 200 may include two or more display units 231.

The audio output unit 232 outputs audio data which is received from the communication unit 210 or stored in the memory 270. The audio output unit 232 outputs an audio signal related to functions performed at the second device 200, for example, a call signal reception sound, a message reception sound, etc. The sound output unit 232 may include a speaker, a buzzer, and so on.

The vibration motor 233 may output a vibration signal. For example, the vibration motor 233 may output a vibration signal which corresponds to an output of audio data or video data, for example, a call signal reception sound, a message reception sound, etc. Additionally, the vibration motor 233 may output a vibration signal if a touch is input to a touch screen.

The sensing unit 240 may sense a status of the second device 200 or a status near the second device 200, and transmit the sensed information to the controller 120.

The sensing unit 240 may include at least one of a magnetic sensor, an acceleration sensor, a temperature and/or humidity sensor, an infrared sensor, a gyroscope sensor, a location sensor, for example, a GPS, a barometric pressure sensor, a proximity sensor, and a RGB sensor (illuminance sensor), but is not limited thereto. Functions of the respective sensors may be inferred from the name of the modules by those of ordinary skill in the art. Thus, a detailed description thereof will not be provided here.

The user input unit 250 is a unit for inputting data so that the user may control the second device 200. For example, the user input unit 250 may include a key pad, a dome switch, a touch pad, which may be a capacitive overlay type, a resistive overlay type, an infrared beam type, a surface acoustic wave type, an integral strain gauge type, or a piezo electric type, a jog wheel, or a jog switch, but is not limited thereto.

The A/V input unit 260 functions to input audio or video signals, and may include a camera 261 and a microphone 262. The camera 261 may obtain an image frame such as a still image or a moving image through an image sensor, in a video phone mode or a photographing mode. An image captured through the image sensor may be processed through the controller 220 or an additional image processing unit (not illustrated).

The image frame processed by the camera 261 may be stored in the memory 270 or transmitted to the outside through the communication unit 110. The A/V input unit 260 may include two or more cameras 261 according to a configuration type of a terminal.

The microphone 262 receives an external sound signal and processes the external sound signal into electrical voice data. For example, the microphone 262 may receive a sound signal from an external device or a speaker. The microphone 262 may employ various noise removal algorithms for removing noise that may be generated in a process of receiving an input of an external sound signal.

The memory 270 may store a program for processing and controlling the controller 220. The memory 270 may also store data, which is input or output, such as service identification information that is preset as filtering information or preset company identification information. The memory 270 may include at least one storage medium such as a flash memory, a hard disk, a multimedia card micro, a card-type memory such as an SD or XD memory, an RAM, as SRAM, an ROM, an EEPROM, a PROM, a magnetic memory, a magnetic disc, and an optical disc. Additionally, the second device 200 may operate a web storage or a cloud server for performing a storage function of the memory 170 on the Internet.

The programs, stored in the memory 270, may be classified into a plurality of modules according to functions thereof. For example, the programs may be classified into a UI module, a camera module, a touch screen module, and an alarm module.

In addition, other various embodiments of the present disclosure may also be implemented through computer readable code and/or instructions in/on a medium, e.g., a computer readable medium, to control at least one processing element to implement any above described embodiment. The medium may correspond to any medium and/or media permitting the storage of the computer readable code.

The computer readable code may be recorded and/or transferred on a medium in a variety of ways. Examples of the medium include recording media, such as magnetic storage media (e.g., ROM, floppy disks, hard disks, etc.) and optical recording media (e.g., CD-ROMs, or DVDs. Furthermore, the processing element could include a processor or a computer processor, and processing elements may be distributed and/or included in a single device.

It should be understood that the embodiments described therein should be considered in a descriptive sense only and not for purposes of limitation. Descriptions of features or aspects within each embodiment should typically be considered as being available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the following claims and their equivalents.

What is claimed is:

1. A method of broadcasting a packet, the method comprising:
    writing service identification information of a device to a header of the packet; and
    broadcasting the packet including the header where the service identification information of the device is written,
    wherein the service identification information of the device comprises information that is used to switch an Application Processor (AP) included in an external device that receives the packet from a sleep mode to an awake mode, and
    wherein the header comprises information about a total number of all packets and identification information about a current packet such that the AP is switched from the sleep mode to the awake mode if all of the packets are received by the external device.

2. The method of claim 1, wherein the header further comprises a hash value of the service identification information and a random value of a number of bits.

3. The method of claim 1,
    wherein the writing of the service identification information of the device comprises:
        generating a random address comprising the service identification information of the device; and
        writing the generated random address to the header of the packet, and
    wherein, when the generated random address matches a random address of another device that is scanned, the generating of the random address is performed again to generate another random address.

4. The method of claim 3, wherein the generated random address further comprises company identification information.

5. The method of claim 1, further comprising:
    writing the information about the total number of all of the packets and the identification information about the current packet to a payload of the packet.

6. A non-transitory computer-readable storage medium having stored thereon a computer program, which when executed by a computer, performs the method of claim 1.

7. A method of adjusting an operation mode of an Application Processor (AP), the method comprising:
    receiving from an external device a packet including a header where service identification information of the external device is written, wherein the header comprises information about a total number of all packets and identification information about a current packet;

extracting the service identification information of the external device from the header of the packet;
comparing the extracted service identification of the external device to service identification information that is preset with regard to a change in an operation mode of the AP;
extracting the information about the total number of all packets and the identification information of the current packet;
determining whether all of the packets are received based on the information about the total number of all of the packets and the identification information of the current packet; and
switching the AP from a sleep mode to an awake mode based on a result of the comparing and a result of the determining.

8. The method of claim 7, wherein the header further comprises a hash value of the service identification information and a random value of a number of bits.

9. The method of claim 7, wherein the switching of the AP from the sleep mode to the awake mode comprises, when a degree of similarity between the extracted service identification information of the external device and preset service identification information is equal to or higher than a threshold value, switching the AP from the sleep mode to the awake mode.

10. The method of claim 7, further comprising:
setting the service identification information with regard to the change in the operation mode of the AP.

11. The method of claim 7, further comprising:
further extracting company identification information of the external device from the header of the packet; and
comparing the extracted company identification information of the external device to company identification information that is preset with regard to a change in an operation mode of the AP.

12. The method of claim 7, wherein the extracting of the information about the total number of all of the packets and the identification information of the current packet comprises extracting the information about the total number of all of the packets and the identification information of the current packet from the header or a payload of the packet.

13. A non-transitory computer-readable storage medium having stored thereon a computer program, which when executed by a computer, performs the method of claim 7.

14. A device for broadcasting a packet, the device comprising:
at least one processor configured to:
write service identification information of a device to a header of the packet; and
a communication interface configured to broadcast the packet including the header where the service identification information of the device is written,
wherein the service identification information of the device comprises information that is used to switch an Application Processor (AP) included in an external device that receives the packet from a sleep mode to an awake mode, and
wherein the header comprises information about a total number of all packets and identification information about a current packet such that the AP is switched from the sleep mode to the awake mode if all of the packets are received by the external device.

15. The device of claim 14,
wherein the processor is further configured to:
generate a random address that comprises the service identification information of the device, and
write the generated random address to the header of the packet, and
wherein, when the generated random address matches a random address of another device that is scanned, the at least one processor is further configured to generate another random address.

16. The device of claim 15, wherein the generated random address further comprises company identification information.

17. The device of claim 14, wherein the at least one processor is further configured to write information about a total number of all packets and identification information about a current packet to a payload of the packet.

18. A device for adjusting an operation mode of an Application Processor (AP), the device comprising:
a communication interface configured to receive from an external device a packet that comprises a header to which service identification information of the external device is written, wherein the header comprises information about a total number of all packets and identification information about a current packet;
at least one processor configured to:
extract the service identification information of the external device from the header of the packet,
extract the information about the total number of all packets and the identification information of the current packet,
determine whether all of the packets are received based on the information about the total number of all of the packets and the identification information of the current packet, and
transmit, based on a result of determining whether all of the packets are received and a result of comparing the extracted service identification of the external device to service identification information that is preset with regard to a change in an operation mode of an AP, an awake mode switching command to the AP; and
an AP configured to switch from a sleep mode to an awake mode based on the awake mode switching command that is received from the at least one processor.

19. The device of claim 18, wherein the at least one processor is further configured to:
extract company identification information of the external device from the header of the packet, and
compare the extracted company identification information of the external device to company identification information that is preset with regard to a change in an operation mode of the AP.

* * * * *